(12) United States Patent
Cho

(10) Patent No.: US 10,716,450 B2
(45) Date of Patent: Jul. 21, 2020

(54) METHOD OF CONTROLLING DISHWASHER

(71) Applicant: LG Electronics Inc., Seoul (KR)

(72) Inventor: Taehwan Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/026,560

(22) Filed: Jul. 3, 2018

(65) Prior Publication Data

US 2019/0000297 A1   Jan. 3, 2019

(30) Foreign Application Priority Data

Jul. 3, 2017  (KR) .................. 10-2017-0084376

(51) Int. Cl.
*A47L 15/42*  (2006.01)
*A47L 15/00*  (2006.01)
*A47L 15/44*  (2006.01)

(52) U.S. Cl.
CPC ....... *A47L 15/4297* (2013.01); *A47L 15/0007* (2013.01); *A47L 15/0028* (2013.01); *A47L 15/0049* (2013.01); *A47L 15/4223* (2013.01); *A47L 15/4285* (2013.01); *A47L 15/44* (2013.01); *A47L 15/4225* (2013.01); *A47L 2401/08* (2013.01); *A47L 2401/30* (2013.01); *A47L 2501/01* (2013.01); *A47L 2501/06* (2013.01); *A47L 2501/30* (2013.01)

(58) Field of Classification Search
None
See application file for complete search history.

(56) References Cited

U.S. PATENT DOCUMENTS 5,797,409 A    8/1998  Cooper et al.
2007/0163626 A1  7/2007  Klein

OTHER PUBLICATIONS

European Search Report in European Appln. No. 18181155.5, dated Nov. 27, 2018, 8 pages.

*Primary Examiner* — Eric W Golightly
(74) *Attorney, Agent, or Firm* — Fish & Richardson P.C

(57) ABSTRACT

A method of controlling a dishwasher is disclosed. The method includes supplying water to a sump, driving a wash pump using a wash motor, introducing a detergent into a tub, and determining whether the amount of bubbles is excessive based on the value of current applied to the wash motor. The determining whether the amount of bubbles is excessive is performed after a lapse of a predetermined period of time since the start of the introducing the detergent into the tub.

13 Claims, 14 Drawing Sheets

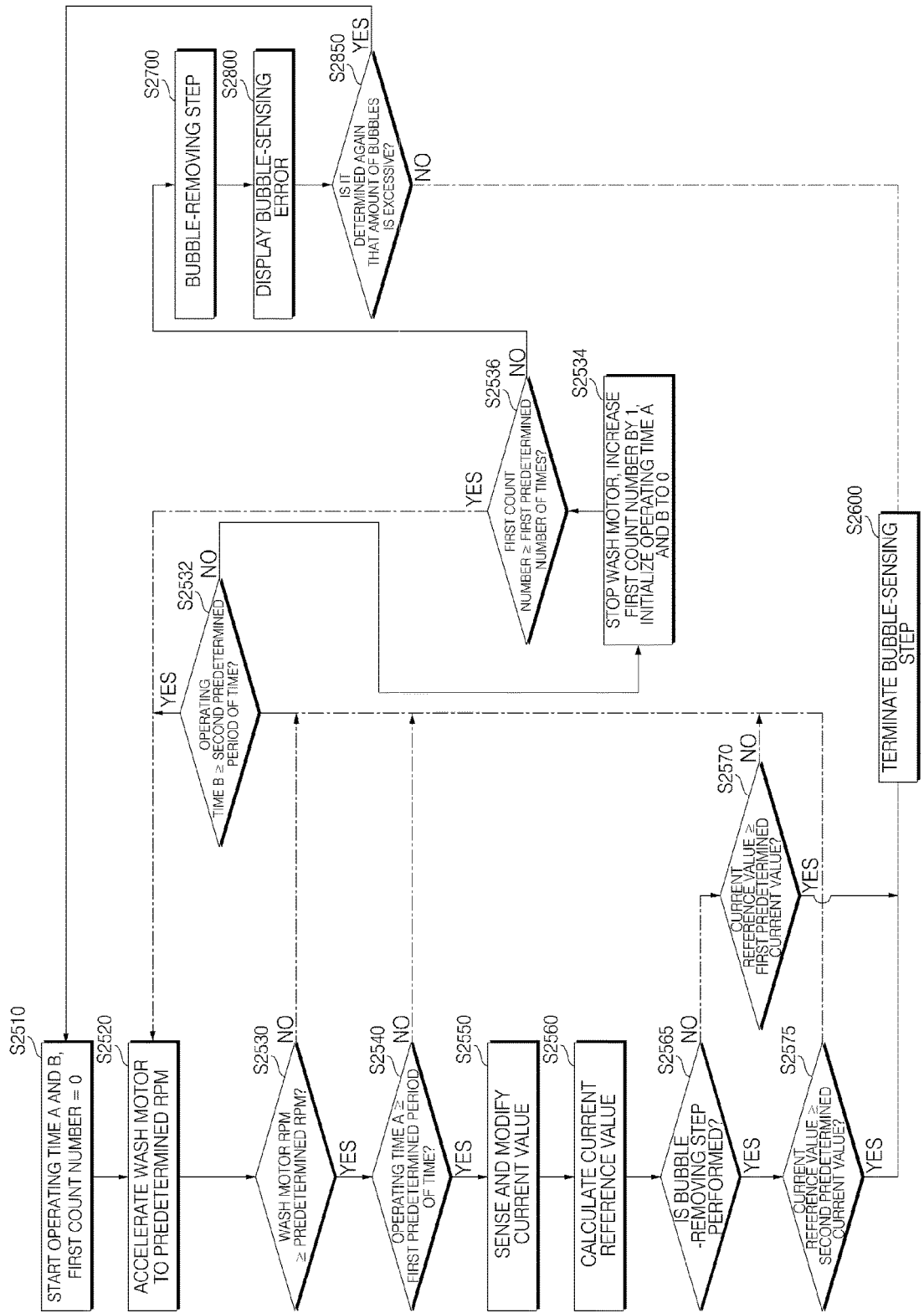

METHOD OF CONTROLLING DISHWASHER

CROSS-REFERENCE TO RELATED APPLICATION

This application claims the priority benefit of Korean Patent Application No. 10-2017-0084376, filed on Jul. 3, 2017 in the Korean Intellectual Property Office, the disclosure of which is incorporated herein by reference.

BACKGROUND OF THE INVENTION

1. Field of the Invention

The present invention relates to a method of controlling a dishwasher, and more particularly to a method of controlling a dishwasher, which may determine whether the amount of bubbles generated in a tub is excessive.

2. Description of the Related Art

A dishwasher is an apparatus that removes contaminants such as food waste from objects to be washed (e.g. dishes or cooking tools) using a detergent and wash water. In order to remove contaminants from dishes and clean the same, the dishwasher performs a preliminary washing process, a main washing process, a rinsing process, a heating-rinsing process, and a drying process.

In the main washing process, a detergent is supplied, and washing is performed using a heater. Specifically, washing is performed in a manner such that wash water mixed with a detergent is circulated through a sealed space in a tub of the dishwasher by a wash pump. In the case in which heat is applied to wash water, which is mixed with a detergent and is circulated in the sealed space by the wash pump, there may occur a problem in that a large amount of bubbles is generated.

In particular, in the case in which a general dishwashing detergent, rather than a detergent for exclusive use in a dishwasher, is used, there is a very high possibility that excessive bubbles will be generated, even overflowing the space formed in the tub.

The amount of bubbles, which is generated by a detergent other than a detergent for exclusive use in a dishwasher, may further increase as the pressure or temperature in the tub increases.

Further, the increase in the amount of bubbles, which is generated by a detergent other than a detergent for exclusive use in a dishwasher, may reduce the capacity of the tub and may increase the pressure in the tub, leading to a continuous increase in the amount of bubbles. Furthermore, if an air guide hole, which is formed in the tub in order to adjust the pressure in the tub, is blocked due to the continuous increase in the amount of bubbles, the amount of air, which is discharged through the air guide hole, is restricted, leading to a sharp increase in the pressure in the tub and an increase in the amount of bubbles.

Furthermore, if the temperature in the tub rises due to a heater during a main washing process, the amount of bubbles in the tub may further increase. The sudden increase in the amount of bubbles in the dishwasher results in leakage of bubbles to the outside of the dishwasher.

SUMMARY OF THE INVENTION

Therefore, the present invention has been made in view of the above problems, and it is an object of the present invention to provide a method of controlling a dishwasher, which may prevent bubbles from leaking outside a tub.

It is another object of the present invention to provide a method of controlling a dishwasher, which may sense in advance the excessive generation of bubbles due to use of a detergent other than a detergent for exclusive use in a dishwasher.

It is a further object of the present invention to provide a method of controlling a dishwasher, which may determine whether the generated amount of bubbles is excessive using a value of current applied to a wash motor.

However, the objects to be accomplished by the invention are not limited to the above-mentioned objects, and other objects not mentioned will be clearly understood by those skilled in the art from the following description.

In accordance with the present invention, the above and other objects can be accomplished by the provision of a method of controlling a dishwasher, the method including supplying water to a sump, driving a wash pump using a wash motor, introducing a detergent into a tub, and determining whether an amount of bubbles is excessive based on a value of current applied to the wash motor, wherein the determining whether the amount of bubbles is excessive is performed after a predetermined period of time has elapsed since the start of the introducing the detergent, thereby sensing the amount of bubbles that are generated by a detergent and water that are mixed with each other.

The method may further include adjusting a passage-switching unit so as to supply wash water discharged from the wash pump to a top nozzle before the determining whether the amount of bubbles is excessive, thereby accurately sensing the amount of bubbles even when the supplied amount of water is small.

The determining whether the amount of bubbles is excessive based on a value of current applied to the wash motor may include sensing a value of current applied to the wash motor and determining whether the amount of bubbles is excessive by comparing a value of current sensed in the sensing the value of current with a first predetermined current value, thereby determining whether the amount of bubbles is excessive through determination on whether a detergent for exclusive use in a dishwasher is used.

The determining whether the amount of bubbles is excessive based on a value of current applied to the wash motor may include accelerating the wash motor to a predetermined RPM, standing by for a first predetermined period of time, sensing a value of current applied to the wash motor that operates at the predetermined RPM after the standing by, and determining whether the amount of bubbles is excessive by comparing a value of current sensed in the sensing the value of current with a first predetermined current value, thereby sensing and determining the value of current after the value of current applied to the wash motor is stabilized.

The method may further include, upon determining that the amount of bubbles is excessive, performing supplying water to the tub, rinsing and discharging water from the tub, thereby removing bubbles before the bubbles leak outside the dishwasher.

The times taken for the supplying water to the tub, the rinsing, and the discharging water from the tub may be set to a ratio of 1:2:1, or the rinsing may be performed within 2 minutes, thereby effectively removing bubbles from the dishwasher.

The method may further include, after the performing the supplying water to the tub, the rinsing and the discharging water from the tub, driving the wash motor at the predetermined RPM, maintaining operation of the wash motor at the predetermined RPM for a predetermined period of time, sensing a value of current applied to the wash motor that operates at the predetermined RPM after the maintaining the operation of the wash motor, and determining whether the amount of bubbles is excessive by comparing a value of current sensed in the sensing the value of current with a second predetermined current value, wherein the second predetermined current value may be set to be higher than the first predetermined current value, thereby re-determining whether the amount of bubbles is excessive under a strict condition after the bubble-removing step.

The objectives and other advantages of the invention may be realized and attained by the structure particularly pointed out in the written description and claims hereof as well as the appended drawings.

BRIEF DESCRIPTION OF THE DRAWINGS

The above and other objects, features and other advantages of the present invention will be more clearly understood from the following detailed description taken in conjunction with the accompanying drawings, in which:

FIG. 15 is a flowchart of the step of determining whether the generated amount of bubbles is excessive, which includes a step of re-determining whether the generated amount of bubbles is excessive according to another embodiment of the present invention.

DETAILED DESCRIPTION OF THE PREFERRED EMBODIMENTS

Figure 1:
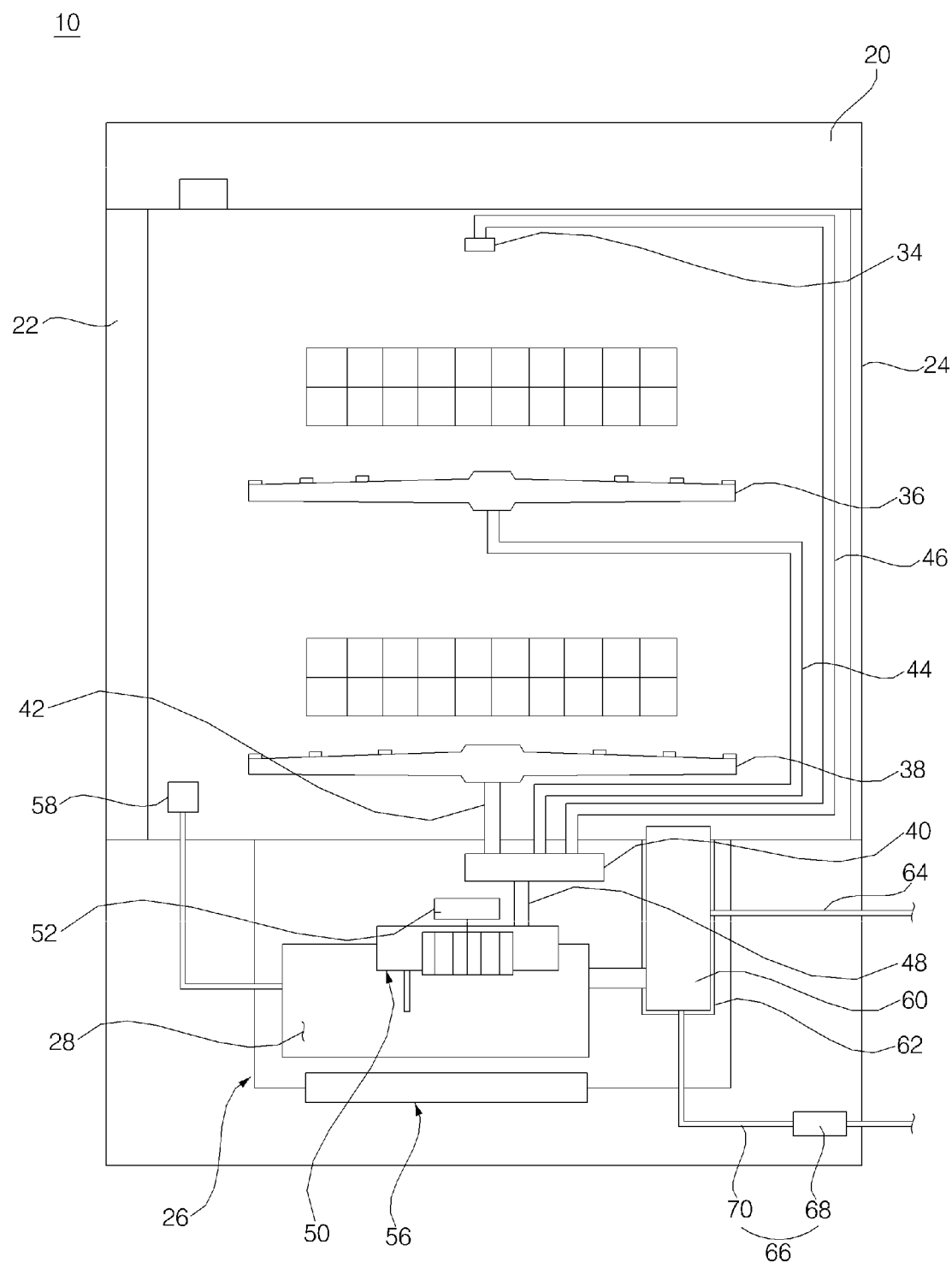
FIG. 1 is a schematic front sectional view of a dishwasher according to one embodiment of the present invention.

Advantages and features of the present invention and methods for achieving those of the present invention will become apparent upon referring to embodiments to be described later in detail with reference to the attached drawings. However, the embodiments are not limited to the embodiments disclosed hereinafter and may be embodied in different ways. The embodiments are provided for completeness of disclosure and to inform persons skilled in this field of art of the scope of the present invention. The same reference numerals may refer to the same elements throughout the specification.

Hereinafter, a method of controlling a dishwasher according to embodiments of the present invention will be described with reference to the accompanying drawings.

Figure 2:
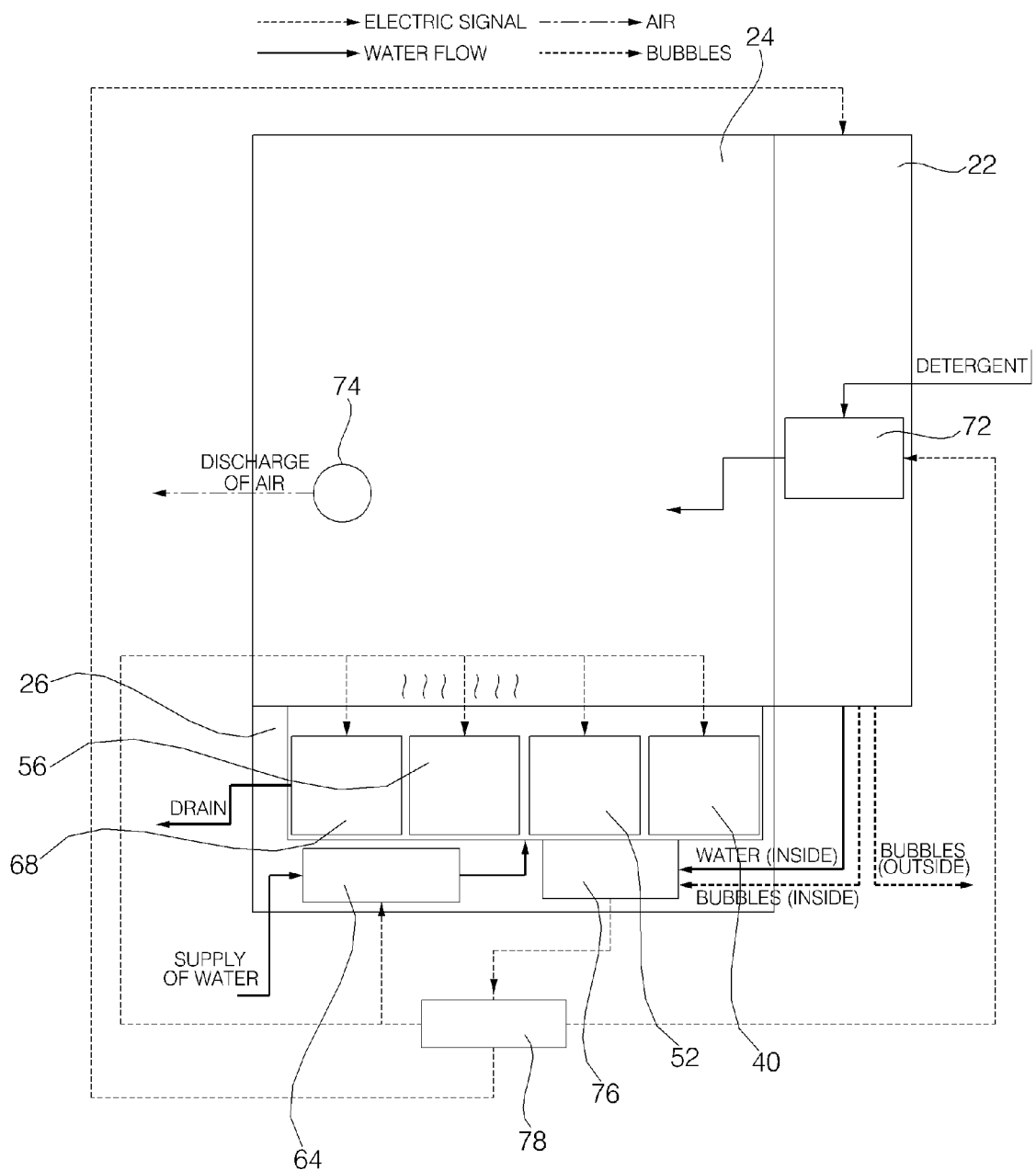
FIG. 2 is a view for explaining the flow of an electric signal, water, a detergent and air in the dishwasher according to the embodiment of the present invention.

FIG. 1 is a schematic front sectional view of a dishwasher according to one embodiment of the present invention. FIG. 2 is a view for explaining the flow of an electric signal, water, a detergent and air in the dishwasher according to the embodiment of the present invention.

The construction of the dishwasher according to the embodiment and the flow of current and water therein will now be described with reference to FIGS. 1 and 2.

Referring to FIG. 1, the dishwasher 10 according to the embodiment includes a cabinet 20 forming the external appearance thereof, a door 22, which is coupled to the cabinet 20 in order to open or close the inner space of the cabinet 20, and a tub 24, which is mounted inside the cabinet 20 and into which wash water or steam is introduced.

The dishwasher 10 according to the embodiment may include a dispenser 72, which stores a detergent input thereto by a user and supplies the detergent to the tub 24 during a washing process. The dispenser 72 may be provided at the door 22.

The tub 24 is a space in which dishes to be washed are loaded. The tub 24 according to the embodiment may have an air guide hole 74 (refer to FIG. 2) formed in a portion thereof, through which air is discharged outside to lower the pressure in the tub 24 when the pressure rises.

The dishwasher 10 according to the embodiment includes racks 30 and 32, which are provided inside the tub 24 in order to accommodate dishes, spray nozzles 34, 36 and 38 for spraying wash water toward the dishes accommodated in the racks 30 and 32, a sump 26 for supplying wash water to the spray nozzles 34, 36 and 38, a wash pump 50 for pumping the wash water stored in the sump 26 to the spray nozzles 34, 36 and 38, and supply lines 42, 44 and 46 for connecting the wash pump 50 to the spray nozzles 34, 36 and 38.

The dishwasher 10 further includes a wash motor 52 for driving the wash pump 50. The wash motor 52 may be embodied as a brushless direct current motor (BLDC motor), the revolution per minute (RPM) of which can be controlled. Since a BLDC motor is used for the wash motor 52, it is possible to set a target RPM. If the RPM of the BLDC motor is varied, the pumping force of the wash pump 50 is also varied.

Even if the RPM of the BLDC motor is constant, the value of current applied to the BLDC motor may vary in accordance with the amount of wash water supplied to the sump or the kind of fluid supplied to the sump. That is, depending on whether the fluid supplied to the sump is water, air or bubbles, even if the wash motor 52 is rotated at a constant RPM, the value of current applied to the wash motor 52 may vary.

The dishwasher 10 according to the embodiment may further include a water supply module 60 for supplying water to the sump 26 or the spray module, a drain module 62 connected to the sump 26 in order to discharge wash water outside, a filter assembly 70 mounted to the sump 26 in order to filter wash water, and a heater 56 mounted to the sump 26 in order to heat wash water.

The dishwasher 10 according to the embodiment includes at least one rack 30 and 32, which is provided inside the tub 24 in order to accommodate the object to be washed, such as dishes. The at least one rack 30 and 32 according to the embodiment includes a lower rack 32, which is located at a lower position in the tub 24, and an upper rack 30, which is located above the lower rack 32.

The dishwasher 10 according to the embodiment includes at least one spray nozzle 34, 36 and 38, which is provided inside the tub 24. The at least one spray nozzle 34, 36 and 38 according to the embodiment includes a lower nozzle 38 for washing the object to be washed accommodated in the lower rack 32, an upper nozzle 36 for washing the object to be washed accommodated in the upper rack 30, and a top nozzle 34 located at the top of the tub 24 in order to spray wash water.

The dishwasher 10 according to the embodiment includes supply lines 42, 44 and 46 for connecting the sump 26 to the spray nozzles 34, 36 and 38. If the wash pump 50 operates to pump the wash water stored in the sump 26, the wash water is supplied to the spray nozzles 34, 36 and 38. The supply lines 42, 44 and 46 according to the embodiment include a first line 42 for supplying wash water to the lower nozzle 38, a second line 44 for supplying wash water to the upper nozzle 36, and a third line 46 for supplying wash water to the top nozzle 34.

The dishwasher 10 according to the embodiment includes a passage-switching unit 40 for supplying the wash water stored in the sump 26 to the first to third lines 42, 44 and 46.

The passage-switching unit 40 according to the embodiment may include a passage-switching motor (not shown) for generating rotational force and a rotating plate (not shown) configured to be rotated by the passage-switching motor in order to adjust the flow of wash water. The rotating plate according to the embodiment may selectively open or close a plurality of connecting holes (not shown), which are formed at a portion from which the supply lines 42, 44 and 46 diverge. The rotating plate may have a plurality of switching holes (not shown) formed therein. The rotating plate is rotated stepwise by the passage-switching motor. When the rotating plate is rotated by the passage-switching motor, the switching holes formed in the rotating plate are positioned so as to correspond to at least one of the connecting holes, whereby the wash water pumped from the wash pump 50 may be supplied to at least one of the spray nozzles 34, 36 and 38.

The passage-switching motor according to the embodiment generates rotational force for rotating the rotating plate stepwise. The passage-switching motor may preferably be a step motor, which is configured to be rotated at a predetermined angle whenever the excitation state is changed in accordance with an input pulse signal and to be stopped at a predetermined position when the excitation state is not changed.

The wash water discharged from the sump 26 through the wash pump 50 flows to the passage-switching unit 40 via a pump pipe 48. The passage-switching unit 40 may supply the wash water discharged from the sump to each of the first to third lines 42, 44 and 46 or to at least two of the same.

The upper nozzle 36 may be located under the upper rack 30. It is desirable for the upper nozzle 36 to be rotatably coupled to the second line 44 so that the upper nozzle 36 may be rotated by force reactionary to the spray of wash water therefrom.

The top nozzle 34 is located above the upper rack 30. The top nozzle 34 is located at the top of the tub 24. The top nozzle 34 receives wash water from the third line 46 and sprays the wash water toward the upper rack 30 and the lower rack 32.

Although, in this embodiment, the spray nozzles 34, 36 and 38 are configured to receive wash water from the sump 26, in which the wash water is stored, and to spray the same, the spray nozzles 34, 36 and 38 may be configured to directly receive wash water from the water supply module 60.

The water supply module 60 is configured to receive water from the outside and to supply the water to the sump 26 through operations of opening and closing a water supply valve 65. In this embodiment, configuration is made such that water is supplied to the sump 26 via the filter assembly 70. The drain module 62 is provided to discharge the wash water stored in the sump 26 to the outside, and includes a drain passage 64 and a drain pump 66.

The filter assembly 70 serves to remove foreign substances, such as food waste, from wash water, and is disposed in the passage through which wash water flows to the sump 26 from the tub 24.

To this end, the sump 26 may be provided with a filter-mounting unit 62, to which the filter assembly 70 is mounted, and a filter passage, through which the filter-mounting unit 62 and the inner space in the sump 26 are connected to each other.

The sump 26 may be connected to a steam nozzle 58, which sprays steam generated by the heater 56 into the tub 24, via a steam passage. The steam passage may be provided with a valve (not shown) for supplying or blocking steam. The valve may allow or prevent the spray of steam into the tub 24, or may adjust the amount of steam as needed.

Herein, the steam generated in the sump 26 may be supplied to the tub 24 through the filter passage and the filter-mounting unit 62, rather than through the steam nozzle. The sump 26 may be bidirectionally connected with the tub 24 via the steam passage and the filter passage.

The dishwasher according to the embodiment may include a water-level-sensing unit, which senses a water level in the tub. The water-level-sensing unit according to the embodiment may include a float 76 (refer to FIG. 2) mounted inside the tub 24 and a water level sensor (not shown) for determining a water level by sensing the height to which the float 76 has risen.

The dishwasher according to the embodiment may further include an input unit (not shown), to which a user inputs commands, and a display unit (not shown) for displaying a state of progression of operation of the dishwasher or information to the user. The input unit may employ a touch-input type or a button-input type. The display unit may employ a display device or a warning lamp.

The electric control with respect to the internal components of the dishwasher and the flow of air, water and bubbles in the dishwasher will now be described with reference to FIG. 2.

The dishwasher according to the embodiment includes a control panel (not shown), which enables the user to select and control the function of the dishwasher. The control panel is provided at the inside thereof with a controller 78, which includes a circuit for operation of the dishwasher and a printed circuit board (PCB), to which various electric elements are mounted.

The PCB is electrically connected to the internal components of the dishwasher, and the controller 78 controls the internal components of the dishwasher through the PCB. The controller 78 may open or close the water supply valve 65 to supply wash water to the tub 24. The controller 78 may activate the heater 56 to heat the wash water stored in the sump 26. The controller 78 may activate the wash pump 50 to make the wash water stored in the sump 26 circulate in the tub 24. The controller 78 may adjust the passage-switching unit 40 to supply the wash water supplied from the wash pump 50 to at least one of the spray nozzles. The controller 78 may activate the passage-switching motor to adjust the position of the rotating plate. The controller 78 may open or close the water supply valve 65 to supply water to the sump 26. The controller 78 may activate the drain pump 68 to discharge wash water from the tub 24. The controller 78 may open or close the door 22 or may sense whether the door 22 is opened. The controller 78 may open the dispenser 72 to input detergent to the tub 24. The controller 78 may sense the height to which the float 76 has risen to detect the water level in the tub 24.

Referring to FIG. 2, detergent may be input to the dispenser 72 by the user, and the detergent stored in the dispenser 72 is introduced into the tub 24 in the washing process of the dishwasher and is mixed with wash water.

Referring to FIG. 2, when the water supply valve 65 is opened, wash water is introduced into the sump 26 from the outside. The wash water may be circulated in the tub 24 by the wash pump 50 and may be discharged outside the dishwasher 10 by the operation of the drain pump 68. The wash water, which circulates in the tub 24, passes through the water-level-sensing unit, and the water-level-sensing unit determines whether the wash water exceeds a predetermined level in the storage space in the sump using the water level sensor or the float 76.

Herein, wash water is a generic term for water supplied from the outside, wash water mixed with detergent in the washing process, and rinse water used in the rinsing process.

Referring to FIG. 2, in the case in which excessive bubbles are generated in the tub during the washing process, the bubbles may leak outside through a gap between the tub and the door, and air may flow through the air guide hole formed in the tub.

Figure 3:
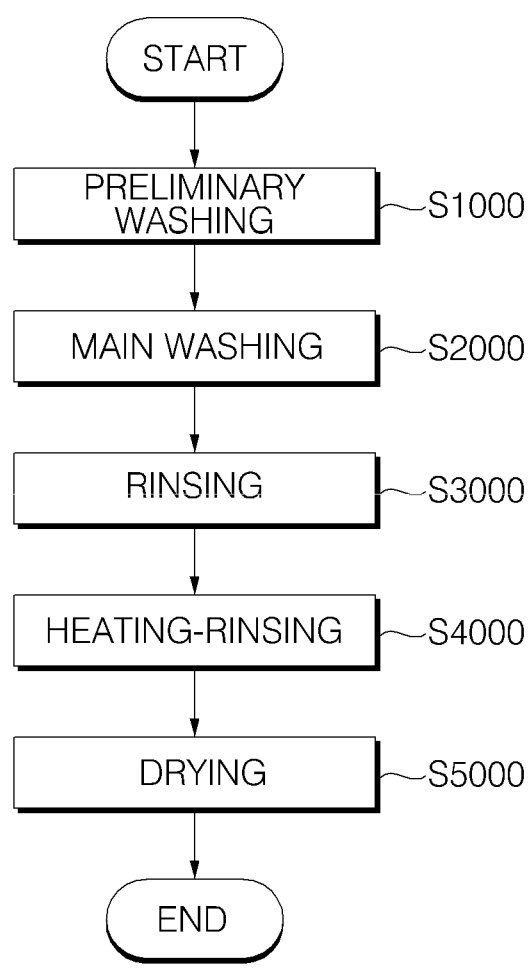
FIG. 3 is a flowchart showing all processes of the dishwasher according to the embodiment of the present invention.
Figure 4:
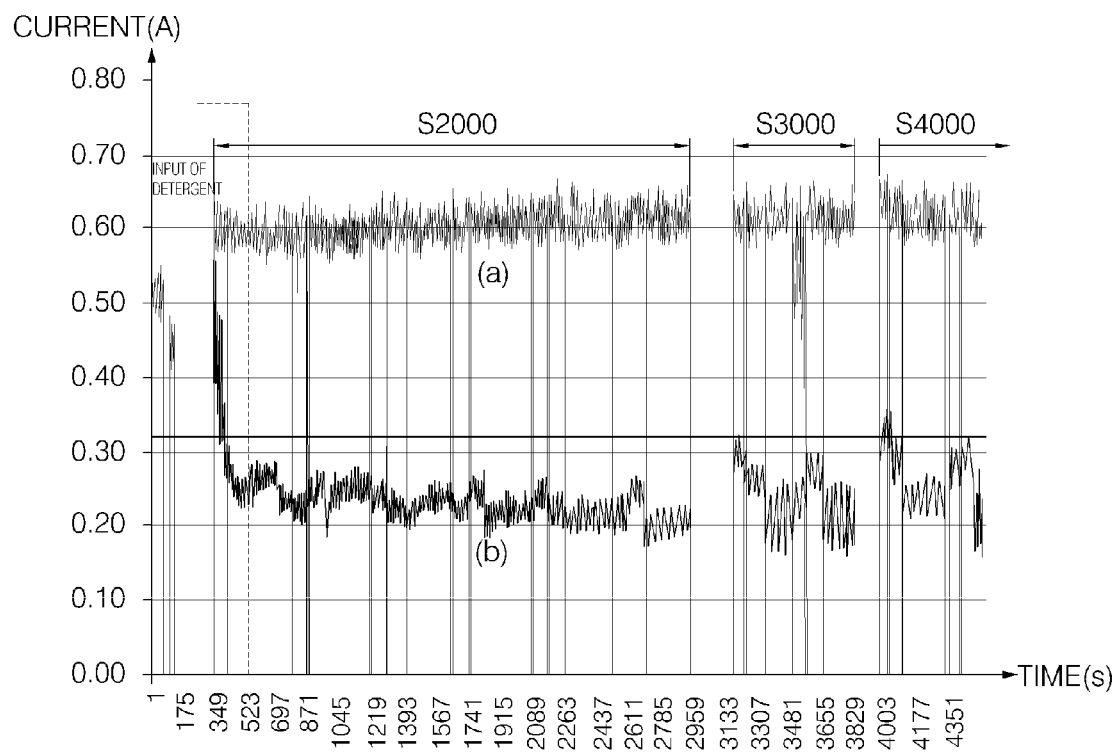
FIG. 4 is a graph showing comparative data between the value of current applied to a wash motor when a detergent for exclusive use in a dishwasher is used and that when a general dishwashing detergent is used in the washing process of the dishwasher.
Figure 5:
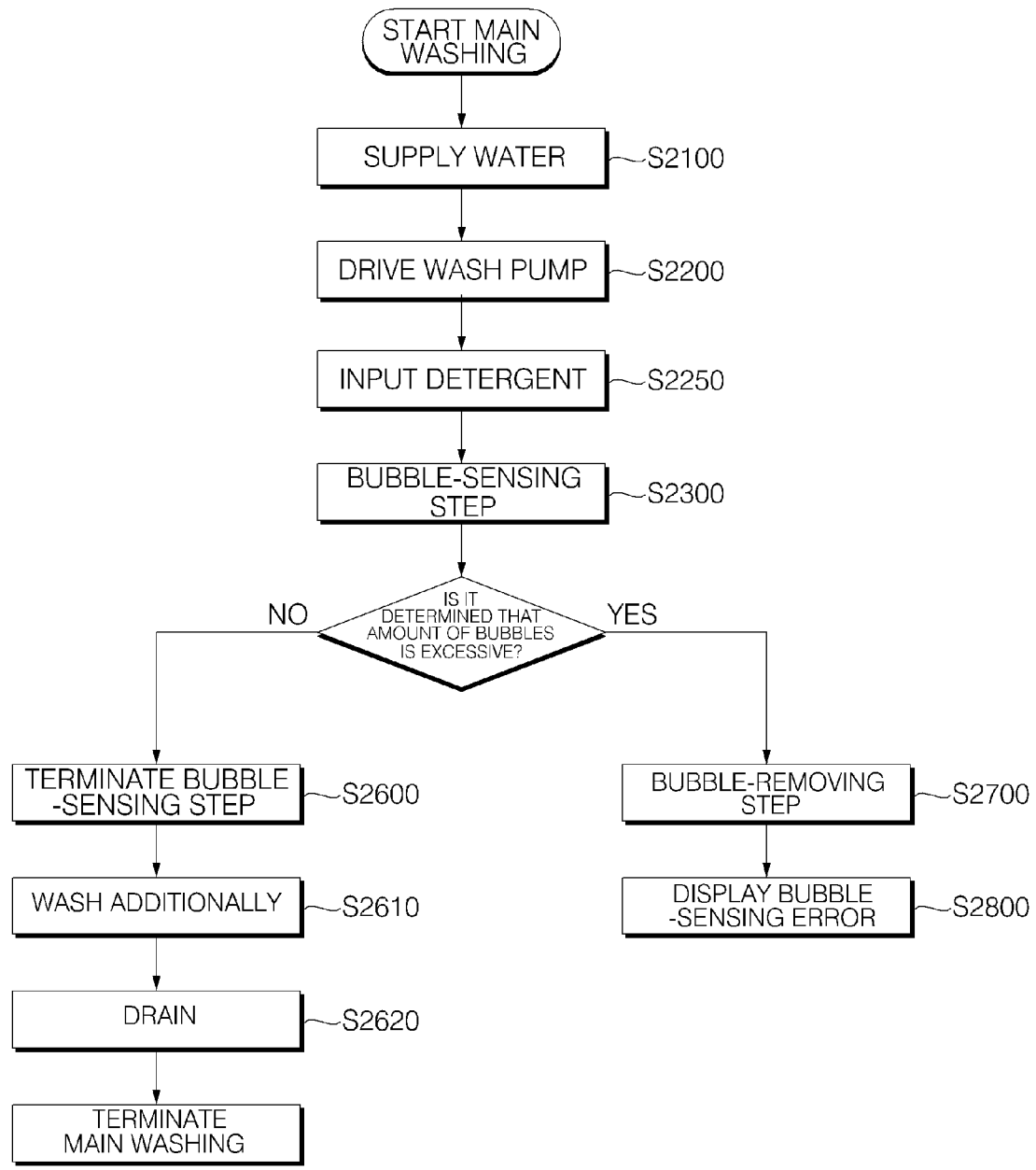
FIG. 5 is a flowchart of the washing step of the main washing process according to the embodiment of the present invention.
Figure 6:
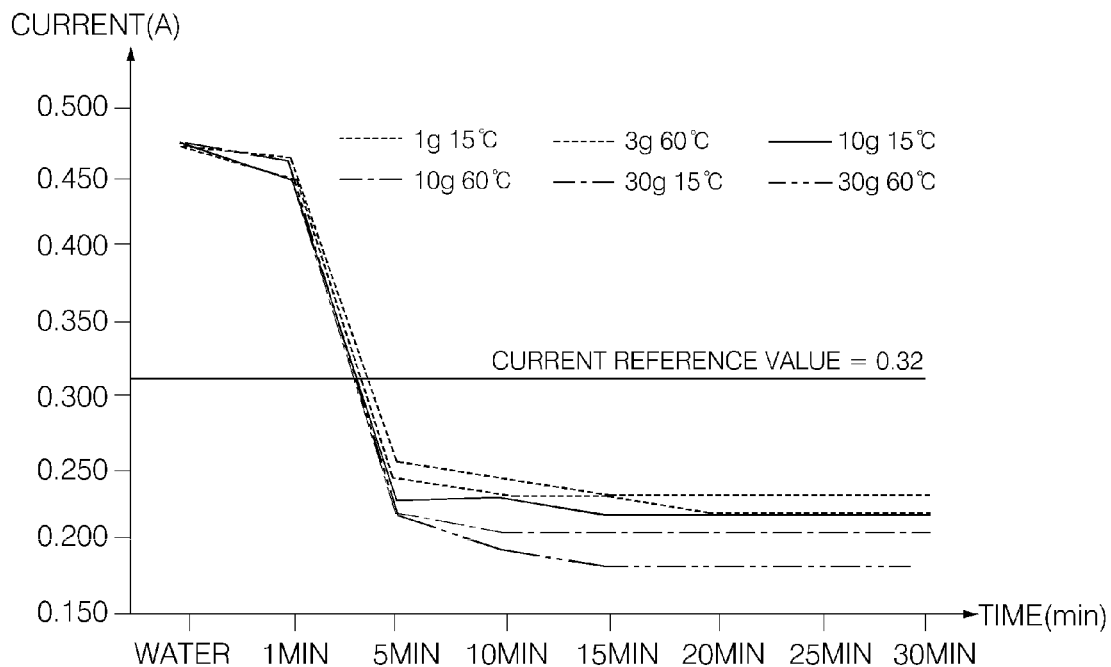
FIG. 6 is a graph showing data describing variation in the value of current applied to the wash motor over time after a detergent is introduced.
Figure 7:
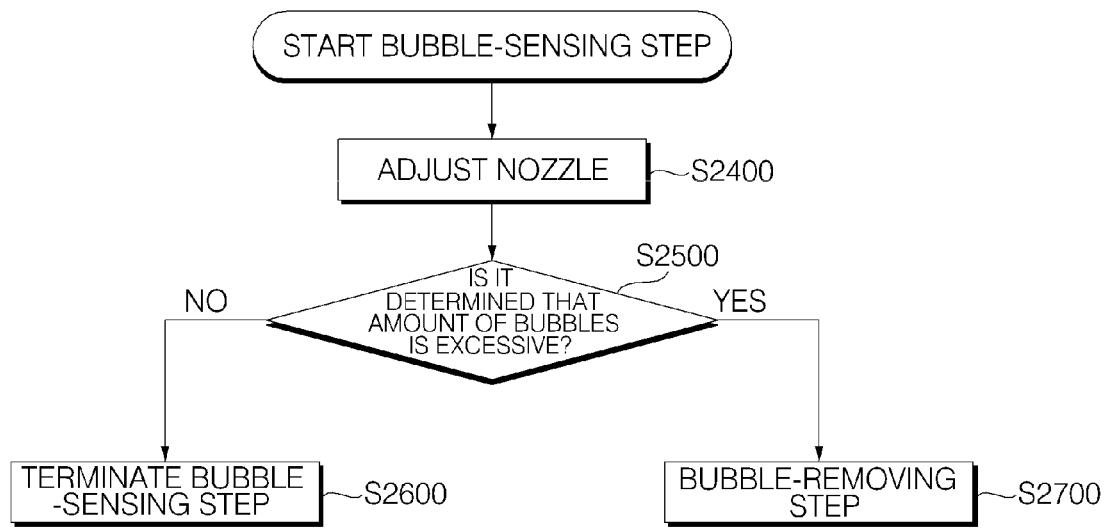
FIG. 7 is a flowchart of the bubble-sensing step according to the embodiment of the present invention.
Figure 8:
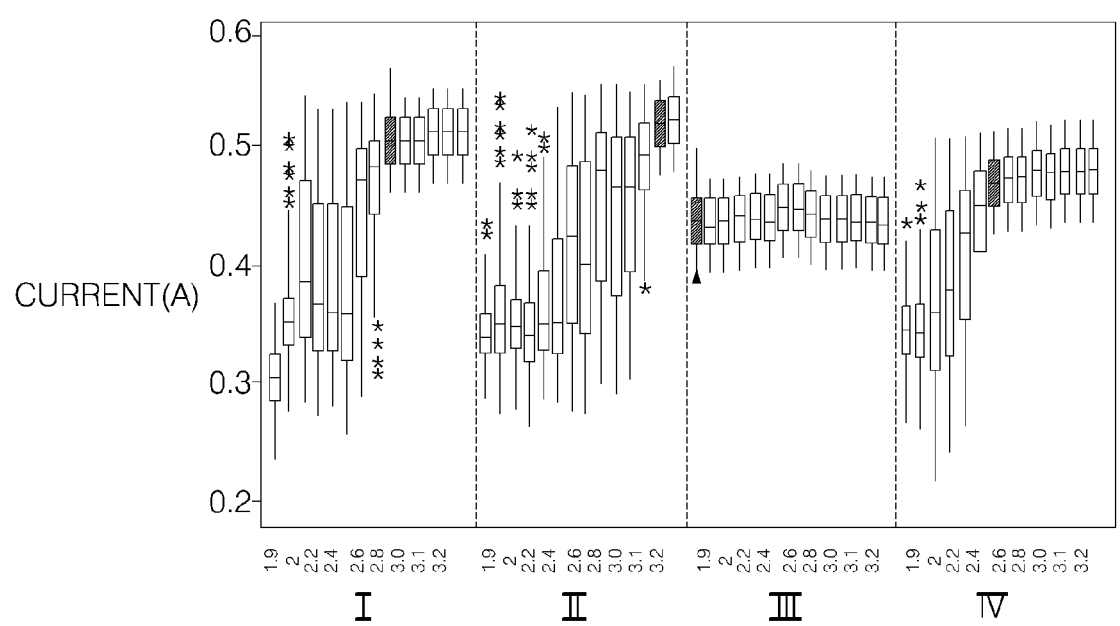
FIG. 8 is a graph showing comparative data describing variation in the value of current applied to the wash motor in accordance with the amount of water supplied to a wash pump through a nozzle connected to a passage-switching unit.
Figure 9:
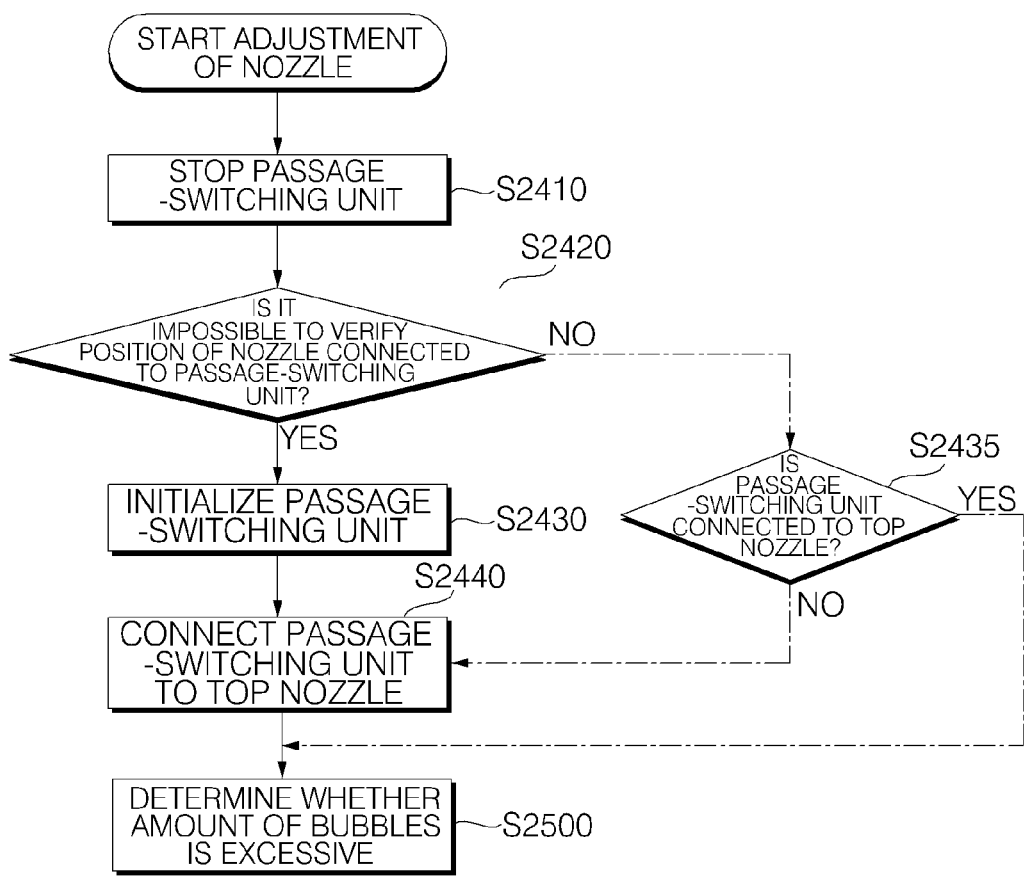
FIG. 9 is a flowchart of the nozzle-adjusting step according to the embodiment of the present invention.
Figure 10:
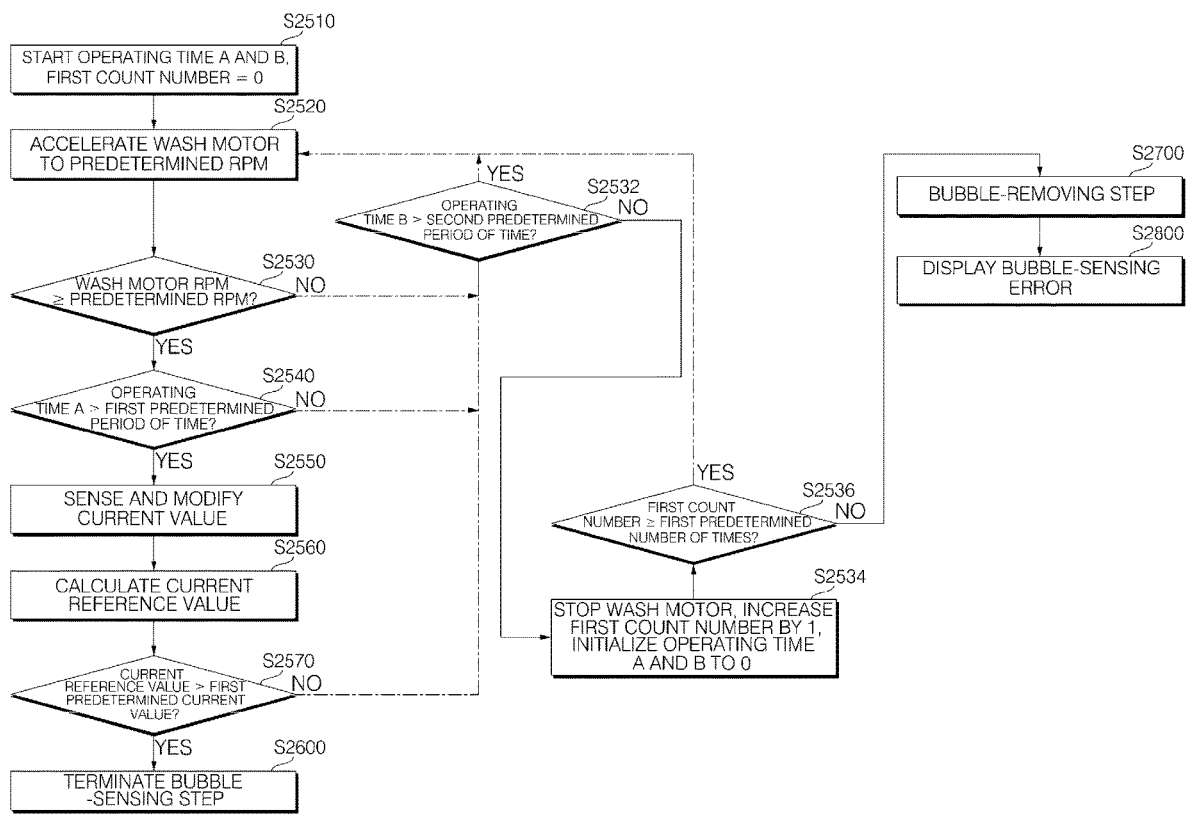
FIG. 10 is a flowchart of the step of determining whether the generated amount of bubbles is excessive according to the embodiment of the present invention.
Figure 11:
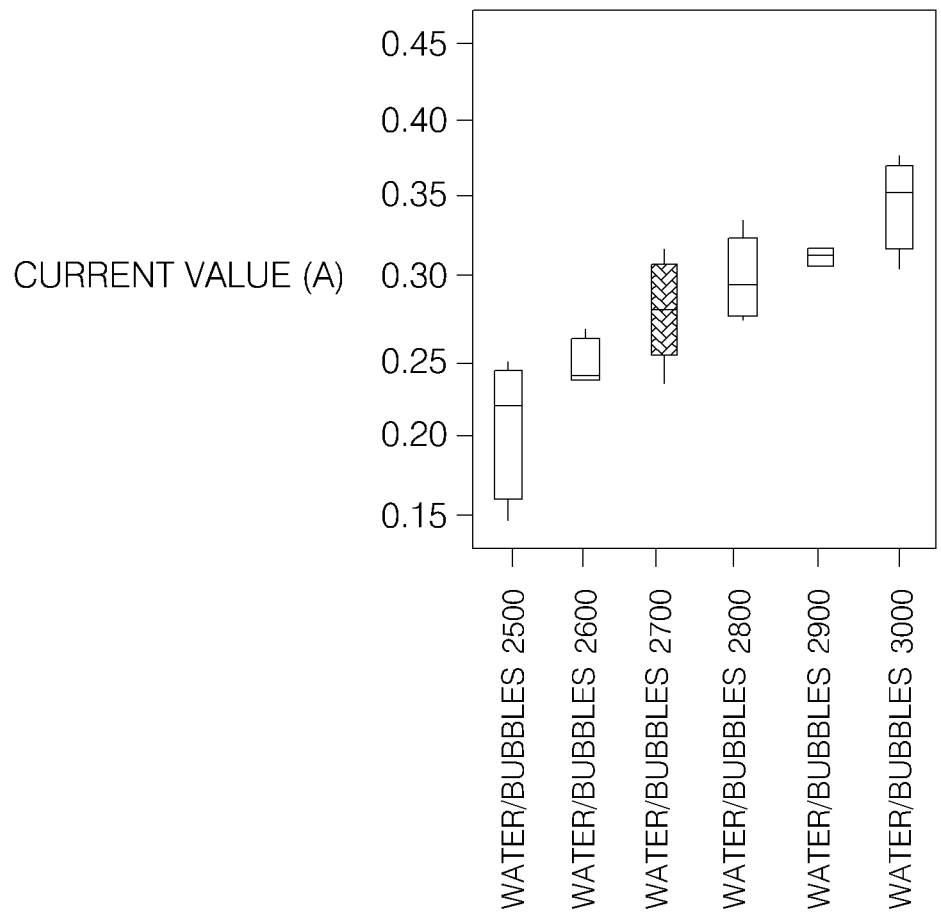
FIG. 11 is a graph showing comparative data describing the difference between the values of current applied to the wash motor in accordance with the RPM of the wash motor when water and bubbles are introduced into the wash pump and when water and air are introduced into the wash pump.
Figure 12:
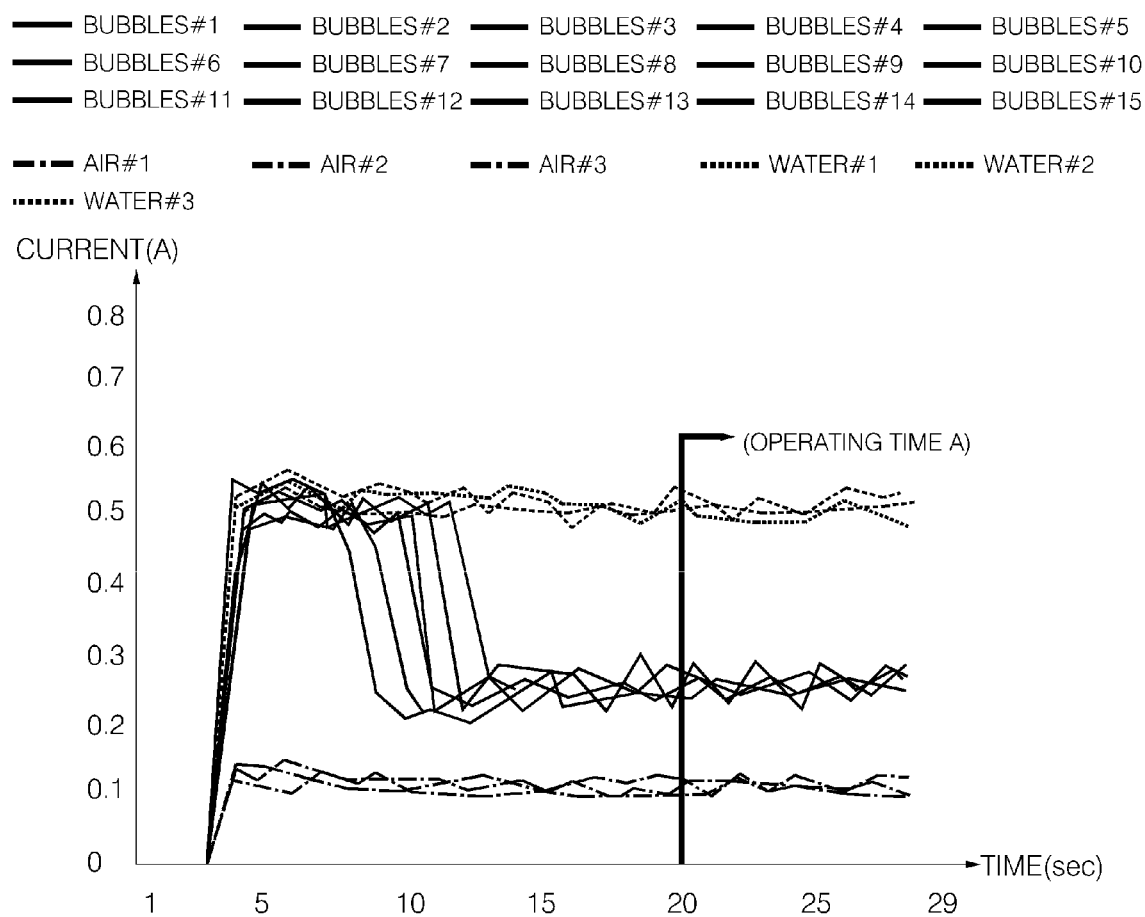
FIG. 12 is a graph showing comparative data describing the values of current applied to the wash motor, which are measured in respective time intervals, in accordance with the fluid supplied to the wash pump when the wash motor rotates at a constant RPM.
Figure 13:
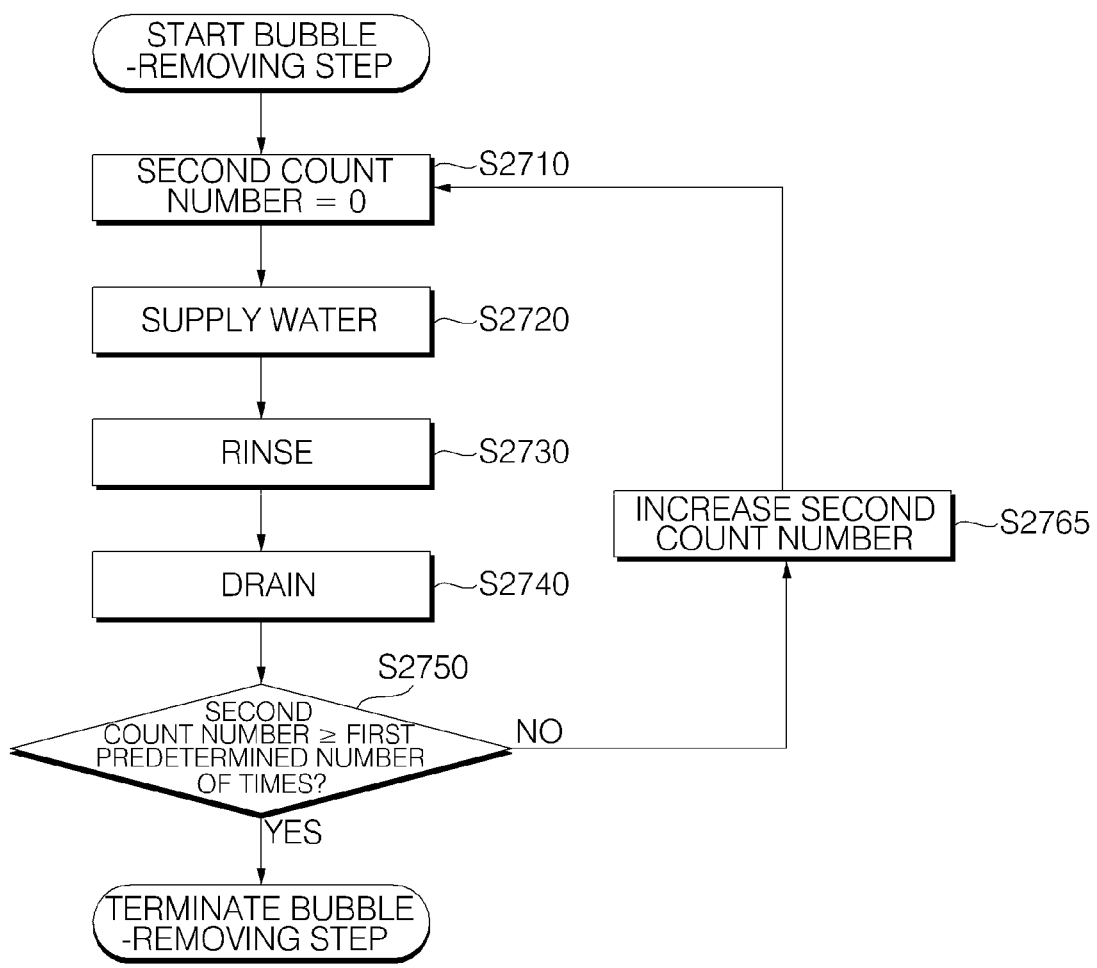
FIG. 13 is a flowchart of the bubble-removing step according to the embodiment of the present invention.
Figure 14:
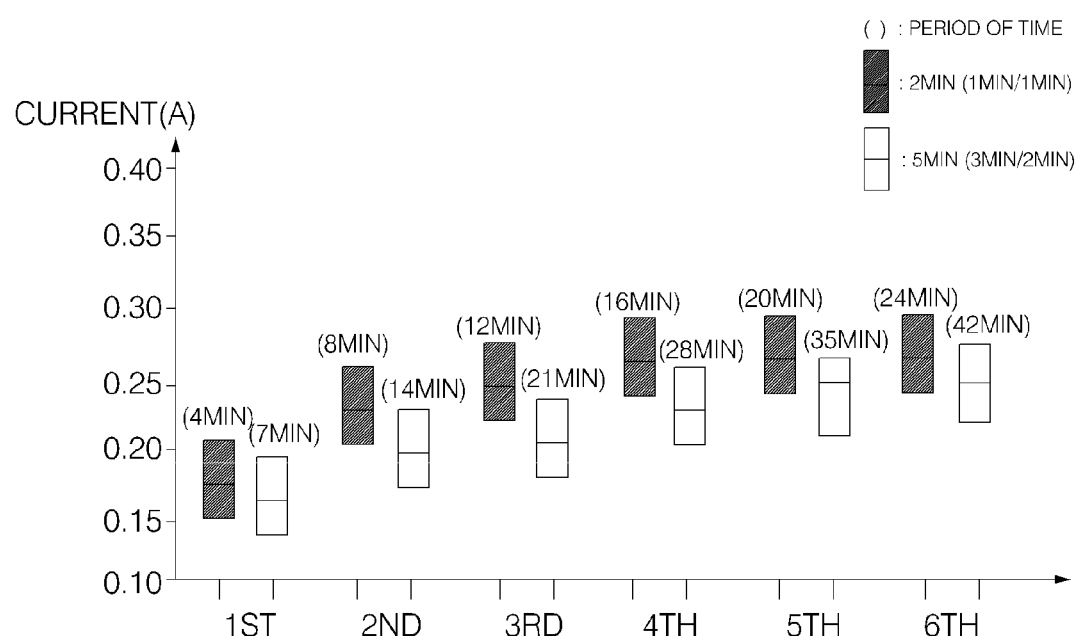
FIG. 14 is a graph showing comparative data describing variation in the values of current, which are measured over a rinse time period in the bubble-removing step.

FIG. 3 is a flowchart showing all processes of the dishwasher according to the embodiment of the present invention. FIG. 4 is a graph showing comparative data between the value of current applied to the wash motor when a detergent for exclusive use in a dishwasher is used and that when a general dishwashing detergent is used in the washing process of the dishwasher. FIG. 5 is a flowchart of a washing step of the main washing process according to the embodiment of the present invention. FIG. 6 is a graph showing data describing variation in the value of current applied to the wash motor over time after a detergent is introduced. FIG. 7 is a flowchart of the bubble-sensing step according to the embodiment of the present invention. FIG. 8 is a graph showing comparative data describing variation in the value of current applied to the wash motor in accordance with the amount of water supplied to the wash pump through the nozzle connected to the passage-switching unit. FIG. 9 is a flowchart of the nozzle-adjusting step according to the embodiment of the present invention. FIG. 10 is a flowchart of the step of determining whether the generated amount of bubbles is excessive according to the embodiment of the present invention. FIG. 11 is a graph showing comparative data describing the difference between the values of current applied to the wash motor in accordance with the RPM of the wash motor when water and bubbles are introduced into the wash pump and when water and air are introduced into the wash pump. FIG. 12 is a graph showing comparative data describing the values of current applied to the wash motor, which are measured in respective time intervals, in accordance with the fluid supplied to the wash pump when the wash motor rotates at a constant RPM. FIG. 13 is a flowchart of the bubble-removing step according to the embodiment of the present invention. FIG. 14 is a graph showing comparative data describing variation in the values of current, which are measured over a rinse time period in the bubble-removing step. FIG. 15 is a flowchart of the step of determining whether the generated amount of bubbles is excessive, which includes a step of re-determining whether the generated amount of bubbles is excessive according to another embodiment of the present invention.

Hereinafter, the method of controlling the dishwasher according to the embodiment of the present invention will be described with reference to FIGS. 3 to 15.

Referring to FIG. 3, the dishwasher washes dishes by sequentially or selectively performing processes of preliminary washing (S1000), main washing (S2000), rinsing (S3000), heating-rinsing (S4000), and drying (S5000).

Describing all of the above processes of the dishwasher briefly, the preliminary washing process (S1000) is a process for removing protein-based contaminants using wash water at a room temperature without heating the wash water, and includes steps of supplying water, washing and draining.

The main washing process (S2000) is a process for removing foreign substances from dishes using a washing detergent, and includes steps of supplying water, washing and draining. The main washing process may remove foreign substances using wash water heated by the heater.

The rinsing process (S3000) is a process for rinsing the dishes, which have undergone the main washing process, using water, and includes steps of supplying water, rinsing and draining. The heating-rinsing process (S4000) is a process of rinsing the dishes using water heated by the heater, and includes steps of supplying water, rinsing and draining. The rinsing step may include a step of heating water. The drying process (S5000) is a process for removing moisture from the dishes, which have undergone the washing and rinsing processes, using air heated by the heater.

Referring to FIG. 5, in the method of controlling the dishwasher according to the embodiment, the main washing process (S2000) includes a step of sensing bubbles (S2300). In the method of controlling the dishwasher according to the embodiment, it is determined in the main washing process whether a detergent specialized for the dishwasher 10 is used based on the value of current applied to the wash motor 52.

The dishwasher 10 according to the embodiment may determine the amount of bubbles supplied to the wash pump 50 based on the value of current applied to the wash motor 52 under the condition that the wash motor 52, which is embodied as a BLDC motor, rotates at a constant RPM. When the amount of bubbles is large under the condition that the wash motor rotates at a constant RPM, the value of current applied to the wash motor 52 is low.

FIG. 4 shows comparative data between (a) the value of current applied to the wash motor 52 when a detergent specialized for a dishwasher is used and (b) the value of current applied to the wash motor 52 when a general dishwashing detergent (hereinafter, referred to as a "non-specialized detergent") is used, under the condition that the wash motor 52 rotates at a constant RPM, e.g. 2700 RPM. As shown in FIG. 4, the value of current when a detergent specialized for a dishwasher is used is 0.5 A or more (refer to (a)) and the value of current when a non-specialized detergent is used is 0.3 A or less (refer to (b)). That is, when a non-specialized detergent is used, the amount of bubbles that is generated is large, and accordingly, the value of current applied to the wash motor is low even though the wash motor rotates at a constant RPM.

The bubble-sensing step (S2300) according to the embodiment includes determining whether the value of current applied to the wash motor 52 is larger than a predetermined current value and determining whether a specialized detergent is used. That is, in the bubble-sensing step (S2300) according to the embodiment, it is possible to determine in advance whether the amount of bubbles in the tub 24 has increased based on a determination of whether the value of current applied to the wash motor 52 is larger than a predetermined current value.

The main washing process of the dishwasher according to the embodiment will now be described with reference to FIG. 5. When the main washing process (S2000) is started, the supply of water is performed (S2100). The controller 78 opens the water supply valve 65 to supply water to the sump 26. After the supply of water, the wash motor 52 drives the wash pump 50 (S2200) so that water circulates in the tub 24. Subsequently, the detergent stored in the dispenser is introduced into the tub (S2250). The controller 78 activates the wash motor 52 and opens the dispenser 72. As the detergent is introduced into the tub and the wash pump operates, wash water, in which water and the detergent is mixed, circulates in the tub, and bubbles are generated by mixing the water and the detergent. The method of controlling the dishwasher according to the embodiment may further include a step of heating the wash water, which circulates in the tub in the main washing process (S2000). The controller activates the heater to heat the wash water that circulates in the tub.

While the wash water, in which the water and the detergent are mixed, circulates in the tub 24 due to the operation of the wash pump 50, the bubble-sensing step (S2300) is performed. There may occur a problem in which bubbles have already leaked outside the tub when the washing step of the main washing process (S2000) is completed. Therefore, after the detergent is introduced into the tub 24, it is desirable to perform the bubble-sensing step (S2300) before the bubbles leak outside the tub 24. When it is determined in the bubble-sensing step (S2300) that the amount of bubbles that is generated is not excessive, the bubble-sensing step is terminated (S2600), and an additional washing step (S2610) and a draining step (S2620) may be performed.

The bubble-sensing step (S2300) according to the embodiment may be performed at the point of time at which bubbles are generated by the operation of the wash pump 50. The bubble-sensing step (S2300) according to the embodiment may be performed after a predetermined time period has elapsed since the introduction of detergent into the tub 24.

FIG. 6 shows data describing the values of current applied to the wash motor in accordance with the quantity of non-specialized detergent and the temperature of the wash water circulating in the tub when a non-specialized detergent is introduced into the tub and the wash motor rotates at a constant RPM. Referring to FIG. 6, when a non-specialized detergent is used, the value of current decreases sharply 3 minutes after the introduction of the detergent and is stabilized 5 minutes after the introduction of the detergent. That is, the characteristics of the non-specialized detergent are exhibited 5 minutes after the introduction of the detergent. Therefore, it is desirable for the bubble-sensing step (S2300) to be performed 5 minutes after the introduction of the detergent into the tub 24.

Referring to FIG. 7, the bubble-sensing step (S2300) may include a step of adjusting the nozzle (S2400), to which the wash water is supplied through the passage-switching unit 40, and a step of determining whether the amount of bubbles is excessive based on the value of current applied to the motor (S2500).

It is desirable for the step of determining whether the amount of bubbles is excessive (S2500) to be performed after the step of adjusting the nozzle (S2400), in which the passage-switching unit 40 is controlled so as to supply the wash water discharged from the wash pump 50 to the top nozzle 34. Because the resistance to the wash water, which is generated in the top nozzle 34, is larger than that in the upper nozzle 36 or the lower nozzle 38, the value of current applied to the wash motor 52 is maintained stable even though a relatively small amount of wash water is supplied to the top nozzle.

Referring to FIG. 8, (I) in the case in which the passage-switching unit 40 is connected to the lower nozzle 38, the value of current applied to the wash motor 52 is maintained stable when the amount of water supplied is 2.71 L or more, and (II) in the case in which the passage-switching unit 40 is connected to the lower nozzle 38 and the top nozzle 34, the value of current applied to the wash motor 52 is maintained stable when the amount of water supplied is 3.1 L or more. Further, (III) in the case in which the passage-switching unit 40 is connected to the top nozzle 34, the value of current applied to the wash motor 52 is maintained stable when the amount of water supplied is 1.91 L or more, and (IV) in the case in which the passage-switching unit 40 is connected to the upper nozzle 36, the value of current applied to the wash motor 52 is maintained stable when the amount of water supplied is 2.511 L or more.

That is, it can be seen from FIG. 8 that the top nozzle 34 is characterized in that the value of current applied to the wash motor 52 does not change much over a wide water supply amount range and in that the value of current applied to the wash motor 52 is maintained stable even when the amount of water that is supplied is smaller than that supplied to the lower nozzle 38 or the upper nozzle 36. Therefore, it is desirable for the step of determining whether the amount of bubbles is excessive (S2500) to be performed using the top nozzle 34, because the value of current applied to the wash motor 52 is maintained stable over a wide water supply amount range therethrough.

Referring to FIG. 9, the step of adjusting the nozzle (S2400) is performed during the washing process, in which the wash pump 50 operates and the detergent is introduced into the tub, and includes a step of stopping the passage-switching unit 40 (S2410) and a step of verifying the position of the spray nozzle connected to the passage-switching unit 40 (S2420). In order to verify the position of the spray nozzle connected to the passage-switching unit 40, the passage-switching unit 40 may be stopped for about 2 seconds.

If it is possible to verify the position of the spray nozzle connected to the passage-switching unit 40, whether the passage-switching unit 40 has been connected to the top nozzle 34 is determined (S2435). If it is determined that the passage-switching unit 40 has not been connected to the top nozzle 34, a step of connecting the passage-switching unit 40 to the top nozzle 34 (S2440) is performed. If the passage-switching unit 40 is connected to the top nozzle 34, the step of determining whether the amount of bubbles is excessive (S2500) is performed.

If it is not possible to verify the position of the spray nozzle connected to the passage-switching unit 40, a step of initializing the passage-switching unit 40 (S2430) is performed, and the step of connecting the passage-switching unit 40 to the top nozzle 34 (S2440) is performed.

It is possible to determine that the initialization of the passage-switching unit 40 (S2430) has been completed or that the connection of the passage-switching unit 40 to the top nozzle 34 (S2440) has been completed, based on the position of the passage-switching unit 40 that is connected to the spray nozzle. It is also possible to determine that the initialization of the passage-switching unit 40 (S2430) has been completed or that the connection of the passage-switching unit 40 to the top nozzle 34 (S2440) has been completed, after a predetermined time period has elapsed since the termination of the step S2430 or the step S2440.

In the step S2500, it is possible to determine whether the amount of bubbles is excessive, based on the value of current applied to the wash motor 52 that drives the wash pump 50. The step of determining whether the amount of bubbles is excessive (S2500) is a step for preventing bubbles from leaking outside the dishwasher due to the excessive generation of bubbles.

When the step of determining whether the amount of bubbles is excessive (S2500) starts, the controller 78 measures the operating time (S2510) and activates the wash motor 52 (S2520). The controller 78 accelerates the wash motor 52 to a predetermined RPM.

In the case in which the fluid supplied to the wash pump 50 is water or bubbles, when the difference between the values of current applied to the wash motor 52 is relatively large, it is easy to sense bubbles based on the difference between the values of current. The higher the RPM of the wash motor 52, the greater the difference between the values of current applied to the wash motor. Therefore, it is desirable for the predetermined RPM to which the wash motor 52 is accelerated to be set as high as possible.

FIG. 11 shows the results of measuring the difference between the values of current applied to the wash motor 52 in accordance with the change in the RPM of the wash motor 52 when water or bubbles are supplied to the wash pump 50. Referring to FIG. 11, when the wash motor rotates at 2700 RPM, the difference in the value of current between water and bubbles is about 0.287 A, which is larger than 0.25 A. Thus, it is desirable for the predetermined RPM to which the wash motor is accelerated to be set to 2700 RPM or higher.

However, considering vibration and noise of the dishwasher, it is desirable for the predetermined RPM to which the wash motor is accelerated to be set to 2900 RPM or lower. In conclusion, in the step of determining whether the amount of bubbles is excessive (S2500), it is desirable for the predetermined RPM to which the wash motor is accelerated to be set in the range from 2700 RPM to 2900 RPM.

If the wash motor 52 rotates at the predetermined RPM or higher (S2530), the controller 78 stands by for a first predetermined period of time (S2540). That is, if the operating time of the wash motor 52 exceeds the first predetermined period of time (operating time A≥first predetermined period of time), the controller 78 measures and collects the value of current applied to the wash motor 52 (S2550).

FIG. 12 shows the values of current applied to the wash motor measured in respective time intervals under the condition that the wash motor 52 is accelerated and rotates at a constant RPM. Referring to FIG. 12, compared to the case in which the wash pump 50 pumps water or air, in the case in which the wash pump 50 pumps bubbles, it can be seen that it takes a relatively long period of time for the value of current applied to the wash motor 52 to be stabilized. Referring to FIG. 12, in the case in which the wash pump 50 pumps bubbles, it can be seen that the value of current applied to the wash motor is stabilized after the lapse of a predetermined period of time, ranging from about 15 to 20 seconds, from the time point at which the wash motor starts to operate. Therefore, it is desirable for the first predetermined period of time to be set in the range from 15 to 20 seconds.

If the wash motor 52 rotates at the predetermined RPM or higher (S2530) and the operating time of the wash motor 52 exceeds the first predetermined period of time, the controller senses and collects the value of current applied to the wash motor 52. In the step of sensing and collecting the value of current (S2550) according to the embodiment, the controller 78 may sense ten values of current per second at 0.1-second intervals and may collect data related thereto. However, the interval and the number of times in which the values of current are sensed may vary depending on the sensing time period and the error range.

Subsequently, the controller 78 performs a step of calculating a first current reference value (S2560) based on the sensed and collected values of current. The current reference value according to the embodiment may be set to an average of the six values of current out of the ten values of current sensed during 1 second, excluding the two highest values and the two lowest values. However, the data used for the current reference value are merely illustrative, and the same may vary depending on the sensing time period and the error range.

Subsequently, the controller 78 determines whether the current reference value calculated in the step S2560 is equal to or greater than a first predetermined current value (S2570). If the current reference value is equal to or greater than the first predetermined current value, the controller terminates the bubble-sensing step.

Referring to FIG. 4, the value of current applied to the wash motor that is sensed when a specialized detergent is used is 0.45 A or higher, and the value of current applied to the wash motor that is sensed when a non-specialized detergent is used is 0.3 A or lower. Therefore, the first predetermined current value may be set in the range from 0.3 A to 0.5 A. However, because the purpose of the embodiment is to determine whether a non-specialized detergent is being used, the first predetermined current value may be set in the range close to 0.3 A, which is the value of current applied to the wash motor 52 when a non-specialized detergent is used. In this embodiment, the first predetermined current value may be set to 0.32 A.

If the current reference value is less than the first predetermined current value, the controller 78 may repeatedly perform a step of sensing the value of current applied to the wash motor for a second predetermined period of time and determining whether the current reference value is equal to or greater than the first predetermined current value (S2532).

In order to more accurately determine whether the generated amount of bubbles is excessive, the second predetermined period of time may be set to be longer than the first predetermined period of time. In this embodiment, the second predetermined period of time may be 5 seconds longer than the first predetermined period of time. In the case in which the first predetermined period of time is 20 seconds, the second predetermined period of time may be set to 25 seconds.

If the current reference value sensed for the second predetermined period of time after the lapse of the first predetermined period of time is less than the first predetermined current value, the controller 78 may perform a bubble-removing step (S2700). If the current reference value sensed for the second predetermined period of time after the lapse of the first predetermined period of time is less than the first predetermined current value, the controller 78 excludes the operation of the heater in the subsequent processes of the dishwasher. The reason for this is to prevent the excessive generation of bubbles due to the operation of the heater. Therefore, when the heater is operating, the operation of the heater is stopped, and when the heater is not operating, electric power is not supplied to the heater in subsequent processes.

However, in order to more accurately determine whether the generated amount of bubbles is excessive, the steps from the wash-motor-activating step (S2520) to the steps of comparing the current reference value with the first predetermined current value for the second predetermined period of time (S2532 and S2570) may be performed a plural number of times (S2536). In this embodiment, if it is determined that the current reference value is continuously less than the first predetermined current value for the second predetermined period of time after lapse of the first predetermined period of time, the steps from the step S2520 to the steps S2532 and S2570 may be set to be performed a plural number of times.

That is, when the step of determining whether the generated amount of bubbles is excessive starts, the controller 78 sets a first count number to 0 (S2510). If the current reference value is less than the first predetermined current value, the controller 78 stops the wash motor 52 and increases the first count number by 1 (S2534). Subsequently, the steps from the wash-motor-activating step (S2520) to the steps of determining the current reference value for the second predetermined period of time (S2532 and S2570) may be set to be repeatedly performed until the first count number reaches a first predetermined number of times. The first predetermined number of times may be set in consideration of the period of time taken to perform the step of determining whether the generated amount of bubbles is excessive and in consideration of accuracy of determination, and, in this embodiment, may be set to 4.

While the steps from the step S2520 to the steps S2532 and S2570 are performed a plural number of times, if the current reference value is continuously less than the first predetermined current value, the bubble-removing step (S2700) is performed.

The bubble-removing step (S2700) according to the embodiment is performed in order to remove bubbles from the tub 24 and consequently to prevent the possibility of occurrence of leakage of bubbles.

In the bubble-removing step (S2700), a step of supplying wash water to the tub 24 (S2720), a step of rinsing by pumping the wash water supplied to the tub 24 using the wash pump (S2730), and a step of discharging the wash water (S2740) are repeatedly performed.

However, in the bubble-removing step (S2700), if the step of pumping the wash water is performed for a long time in the state in which bubbles are present in the tub 24, there is a concern that additional bubbles will be generated. Therefore, it is desirable to minimize the time taken for the rinsing step (S2730).

In the bubble-removing step (S2700) according to the embodiment, the time taken for the rinsing step (S2730) may be set to be within a predetermined period of time. In the bubble-removing step (S2700) according to the embodiment, the times taken for the water-supply step (S2720), the rinsing step (2730) and the water-discharging step (S2740) may be set to a ratio of 1:2:1. In the bubble-removing step (S2700) according to the embodiment, the time taken for the rinsing step (S2730), which is performed between the water-supplying step (S2720) and the water-discharging step (S2740), may be set to be equal to or less than 2 minutes. In the bubble-removing step (S2700) according to the embodiment, the time taken for the rinsing step (S2730) may be set to be 1.5 to 2.5 times as long as the time taken for the water-supplying step (S2720) or the water-discharging step (S2740). Because the purpose of the rinsing step (S2730) in the bubble-removing step (S2700) is not to rinse the dishes accommodated in the tub but to remove bubbles from the tub, it is desirable to minimize the time taken for the rinsing step (S2730) in order to minimize the amount of bubbles that are generated due to the rinsing and to rapidly remove the bubbles.

Accordingly, it is possible to effectively remove bubbles from the tub by minimizing the time taken for the rinsing step (S2730) and repeatedly performing the bubble-removing step (S2700) according to the embodiment.

FIG. 14 shows the variation in the values of current measured when the time taken for the rinsing is set to 2 minutes and when the same is set to 5 minutes in the bubble-removing step (S2700). At this time, each of the time taken for the supply of water and the time taken for the discharge of water is set to 1 minute. Some of the periods of time given in parentheses in FIG. 14 indicate the sum of the periods of time taken for the supply of water, the rinsing and the discharge of water, and others indicate the periods of time accumulated in accordance with the number of repetitions of the bubble-removing step. Referring to FIG. 14, it can be seen that the shorter the time taken for the rinsing, among the supply of water, the rinsing and the discharge of water, the more rapidly the value of current applied to the wash motor 52 increases. The increase in the value of current applied to the wash motor 52 implies that bubbles are being removed from the fluid supplied to the wash pump 50.

Referring to FIG. 14, when 20 minutes have passed since the start of the bubble-removing step (S2700), if the time taken for the rinsing (S2730) is 2 minutes, the bubble-removing step (S2700) may be performed 5 times, and if the time taken for the rinsing (S2730) is 5 minutes, the bubble-removing step (S2700) may be performed 3 times. That is, it can be seen that the shorter the time taken for the rinsing (S2730), the more rapidly bubbles are removed from the tub 24.

Referring to FIG. 14, the value of current applied to the wash motor is stabilized from the $4^{th}$ iteration of the steps of supplying water, rinsing and discharging water in the bubble-removing step (S2700). That is, referring to FIG. 13, the steps of supplying water, rinsing and discharging water in the bubble-removing step may be set to be performed a plural number of times.

When the bubble-removing step (S2700) starts, the controller 78 sets a second count number to 0 (S2710). If the second count number does not reach a second predetermined number of times, the controller 78 increases the second count number by 1 (S2755). The steps of supplying water, rinsing and discharging water are repeatedly performed until the second count number reaches the second predetermined number of times (S2750). Referring to FIG. 14, since the value of current applied to the wash motor is stabilized from the $4^{th}$ iteration of the steps of supplying water, rinsing and discharging water, the second predetermined number of times may be set to 4 or more. In the bubble-removing step (S2700) according to the embodiment, the steps of supplying water, rinsing and discharging water may be repeatedly performed at least four times within a predetermined period of time, and at this time, the predetermined period of time may be set to 20 minutes in order to perform the steps of supplying water, rinsing and discharging water several times in a relatively short period of time.

Referring to FIG. 10, after the bubble-removing step is performed, a step of indicating a bubble-sensing error to the user (S2800) may be performed. The controller 78 may indicate the bubble-sensing error to the user by displaying information related thereto on the display unit or outputting an alarm sound, and may terminate all processes of the dishwasher. The dishwasher according to the embodiment may further include a communication unit, which enables communication with a terminal of the user. The controller 78 may transmit information related to the bubble-sensing error to the terminal of the user via the communication unit.

Such a bubble-sensing error may enable the user to recognize that bubbles may be generated to an extent that would exceed the capacity of the tub 24 in the dishwasher due to use of a non-specialized detergent.

Referring to FIG. 15, a step of re-determining whether the amount of bubbles is excessive may be performed after the step of displaying the bubble-sensing error.

The step of re-determining whether the amount of bubbles is excessive (S2850) is almost the same as the step of determining whether the amount of bubbles is excessive (S2500), but is different in that the current reference value is compared with a second predetermined current value, rather than with the first predetermined current value. Therefore, after the step of calculating the current reference value (S2560), whether the bubble-removing step has been performed is determined (S2565). If the bubble-removing step (S2700) has been performed, a step of comparing the current reference value with the second predetermined current value is performed (S2575).

The second predetermined current value is set to be higher than the first predetermined current value. Because the step of re-determining whether the amount of bubbles is excessive (S2850) is performed after the bubble-removing step (S2700) and a large amount of bubbles has already been removed from the tub 24 through the bubble-removing step (S2700), the re-determining step (S2850) requires a higher current value. Considering that a large amount of bubbles has already been removed from the tub 24 through the bubble-removing step (S2700), the second predetermined current value may be set to be 0.05 A higher than the first predetermined current value. Therefore, when the first predetermined current value is 0.32 A, the second predetermined current value may be set to 0.37 A.

As is apparent from the above description, a method of controlling a dishwasher according to the present invention has the following effects.

First, it is possible to prevent bubbles from leaking outside a tub by determining whether the generated amount of bubbles is excessive based on the value of current applied to a wash motor in a main washing process.

Second, it is possible to accurately determine whether the generated mount of bubbles is excessive by performing the determination after a predetermined period of time has elapsed since detergent and water were mixed.

Third, it is possible to accurately determine whether the generated amount of bubbles is excessive even when the supplied amount of water is small, by performing the determination using a top nozzle.

Finally, since a bubble-removing step is performed when it is determined that the amount of bubbles is excessive, it is possible to immediately remove bubbles when excessive bubbles are generated and consequently to prevent the bubbles from leaking outside the tub.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:
1. A method of controlling a dishwasher, the method comprising:
 supplying water to a sump of the dishwasher;
 driving a wash pump of the dishwasher based on operation of a wash motor of the dishwasher;
 introducing detergent into a tub of the dishwasher; and
 determining whether an amount of bubbles in the tub corresponds to an excessive level based on a value of current applied to the wash motor,
 wherein determining whether the amount of bubbles in the tub corresponds to the excessive level is performed after a lapse of a predetermined time from a start of introduction of detergent to the tub, and includes:
  accelerating the wash motor to a predetermined rotation per minute (RPM),
  measuring an operation time of the wash motor that has elapsed since a start of acceleration of the wash motor,
  in response to the operation time exceeding a first predetermined period of time, sensing a value of current applied to the wash motor based on operation of the wash motor at the predetermined RPM,
  comparing the sensed value of current to a first predetermined current value, and
  based on the comparison of the sensed value of current to the first predetermined current value, determining whether the amount of bubbles in the tub corresponds to the excessive level.

2. The method according to claim 1, further comprising controlling a passage-switching unit to supply wash water discharged from the wash pump to a top nozzle of the dishwasher before determining whether the amount of bubbles in the tub corresponds to the excessive level.

3. The method according to claim 1, wherein determining whether the amount of bubbles in the tub corresponds to the excessive level includes:
 sensing a value of current applied to the wash motor;
 comparing the sensed value of current to a first predetermined current value; and based on the comparison of the sensed value of current to the first predetermined current value, determining whether the amount of bubbles in the tub corresponds to the excessive level.

4. The method according to claim 3, wherein comparing the sensed value of current to the first predetermined current value comprises determining that the sensed value of current is less than or equal to the first predetermined current value, and wherein the method further comprises:
heating water in the sump using a heater of the dishwasher based on supply of water to the sump, and
based on a determination that the sensed value of current is less than or equal to the first predetermined current value, excluding operation of the heater from a subsequent process.

5. The method according to claim 1, wherein sensing the value of current applied to the wash motor comprises sensing a plurality of values of current applied to the wash motor, and wherein determining whether the amount of bubbles in the tub corresponds to the excessive level comprises comparing an average value of the plurality of values of current to the first predetermined current value.

6. The method according to claim 5, wherein sensing a value of current applied to the wash motor based on operation of the wash motor at the predetermined RPM, comparing the sensed value of current to a first predetermined current value, and based on the comparison of the sensed value of current to the first predetermined current value, determining whether the amount of bubbles in the tub corresponds to the excessive level are repeatedly performed for a second predetermined period of time, and wherein the second predetermined period of time is set to be longer than the first predetermined period of time.

7. The method according to claim 1, further comprising, based on a determination that the amount of bubbles in the tub corresponds to the excessive level, supplying water to the tub, rinsing the tub, and discharging water from the tub.

8. The method according to claim 7, further comprising:
repeating, a plurality of times, performance of accelerating the wash motor to the predetermined RPM, measuring the operating time, sensing the value of current applied to the wash motor, and determining whether the amount of bubbles corresponds to the excessive level;
counting, among the plurality of times, consecutive determinations that the amount of bubbles corresponds to the excessive level; and
based on a count of the consecutive determinations being greater than or equal to a predetermined number of times, supplying water to the tub, rinsing the tub, and discharging water from the tub.

9. The method according to claim 7, further comprising setting a ratio of implementation durations to 1:2:1 for supplying water to the tub, rinsing the tub, and discharging water from the tub, respectively.

10. The method according to claim 7, wherein rinsing the tub comprises rinsing the tub for a duration that is greater than or equal to 2 minutes.

11. The method according to claim 7, further comprising repeating performance of supplying water to the tub, rinsing the tub, and discharging water from the tub.

12. The method according to claim 11, wherein repeating performance of supplying water to the tub, rinsing the tub, and discharging water from the tub comprises completing, within twenty minutes or less, at least four repetitions of performance of supplying water to the tub, rinsing, and discharging water from the tub.

13. The method according to claim 7, further comprising, based on performance of supplying water to the tub, rinsing the tub, and discharging water from the tub:
driving the wash motor to the predetermined RPM;
maintaining operation of the wash motor at the predetermined RPM for a predetermined period of time;
sensing a value of current applied to the wash motor based on maintaining operation of the wash motor at the predetermined RPM;
comparing the sensed value of current to a second predetermined current value that is greater than the first predetermined current value; and
based on the comparison of the sensed value of current to the second predetermined current value, determining whether the amount of bubbles corresponds to the excessive level.

* * * * *